(12) United States Patent
Nishihara

(10) Patent No.: US 6,346,574 B1
(45) Date of Patent: Feb. 12, 2002

(54) FIRE RETARDANCE-IMPARTING ADDITIVE

(75) Inventor: Hajime Nishihara, Yokohama (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 0 days.

(21) Appl. No.: 09/610,486

(22) Filed: Jul. 5, 2000

Related U.S. Application Data

(63) Continuation-in-part of application No. 09/604,817, filed on Jun. 28, 2000, now abandoned.

(51) Int. Cl.$^7$ .................................................. C08F 8/00
(52) U.S. Cl. ...................................................... 525/132
(58) Field of Search ........................................ 525/132

(56) References Cited

FOREIGN PATENT DOCUMENTS

| DE | 3037309 | 4/1981 |
|---|---|---|
| DE | 3232811 | 3/1983 |
| JP | 63215722 | 9/1988 |
| JP | 63312883 | 12/1988 |
| JP | 18090 | 1/1989 |
| JP | 1294729 | 11/1989 |
| JP | 269283 | 3/1990 |
| JP | 2136285 | 5/1990 |
| JP | 6141525 | 5/1994 |
| JP | 6240079 | 8/1994 |
| JP | 6248013 | 9/1994 |
| JP | 7268028 | 10/1995 |
| JP | 9316432 | 12/1997 |

OTHER PUBLICATIONS

Proceedings of the $^{th}$ Sony Research Forum, p. 552 (1996) "Improvement of Heat–resistant polystyrene/poly(phenylene oxide) alloys" by Yasuhito Inagaki et al.

Polymer, vol. 33, No. 6, 1210 (1992) "Miscibility and immiscibility in functionalized associating polymer systems: polystyrene–poly (phenylene oxide) blends" by Dong–Tsai Hseih and Dennis G. Peiffer.

Primary Examiner—Terressa M. Boykin
(74) Attorney, Agent, or Firm—Birch, Stewart, Kolasch & Birch, LLP

(57) ABSTRACT

A fire retardance-imparting additive which comprises a substituted aromatic vinyl resin having acid salt groups as the substituents on the aromatic rings and comprises a structure represented by the following formula:

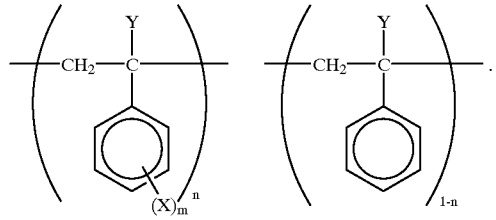

7 Claims, 1 Drawing Sheet

FIRE RETARDANCE-IMPARTING ADDITIVE

This application is a continuation-in-part of application Ser. No. 09/604,817, filed on Jun. 28, 2000, now abandon.

BACKGROUND OF THE INVENTION

1. Field of the Invention

The present invention relates to a fire retardance-imparting additive. More particularly, it relates to a fire retardance-imparting additive that can impart an excellent retardance.

2. Description of the Related Art

Thermoplastic resins are used in various fields such as the fields of automobile parts, household appliance parts, office automation appliance parts, etc. because they are excellent in not only moldability but also impact resistance, but they have limited use because of their high flammability.

As a method for imparting fire retardance to a thermoplastic resin, the addition of a halogen-containing, phosphorus-containing or inorganic fire retardant to the thermoplastic resin is known and it achieves a certain extent of fire retardance. However, in recent years, the need for thermoplastic resins to be safe in the presence of fire has been suddenly highlighted, and there has been an eager desire for the development of an improved technique for imparting fire retardance which does not also create environmental problems and does not deteriorate the resin's mechanical properties.

On the other hand, there are known compositions containing a substituted aromatic vinyl resin having inorganic acid salt groups as the substituents on the aromatic rings, such as polystyrene sulfonic acid salts. For example, there are known a process for producing a stabilized resin from a polystyrene sulfonic acid sodium salt and a polyvinyl chloride (JP-A-7-268028), a process for producing a stabilized resin from a polystyrene sulfonic acid sodium salt and a polyolefin (JP-A-6-248013), a thermal printing paper containing a polystyrene sulfonic acid alkanolamine salt (JP-A-2-136285), a thermal recording material comprising an acrylic emulsion containing a polystyrene sulfonic acid salt (JP-A-2-69283), a thermo-setting resin comprising a polystyrene sulfonic acid salt and a methylol-group-containing polystyrene (JP-A-1-294729), a thermal recording material comprising a polystyrene sulfonic acid salt (JP-A-6-3312883 and JP-A-1-8090), a material for organic semiconductor comprising a polystyrene sulfonic acid salt (JP-A-6-3215722), an antistatic polyester film comprising a polystyrene sulfonic acid sodium salt (JP-A-6-141525), microcapsules for pressure-sensitive copying paper which contain a polystyrene sulfonic acid salt (German Patent Nos. 3232811 and 3037309), a heat-resistant resin comprising a polystyrene/polyphenylene oxide alloy (Proceedings of the 6th Sony Research Forum p. 552 (1996)), the miscibility of a polymer system obtained by introducing a sulfonate into polystyrene/polyphenylene oxide (Polymer, Vol. 33, Nr6, 1210 (1992)), etc. Such compositions, however, are different in make-up from the fire retardance-imparting additive of the present invention, and a use of a specific polystyrene sulfonic acid salt as a fire retardance-imparting additive has not been known.

SUMMARY OF THE INVENTION

In view of such conditions, the present invention is intended to provide a fire retardance-imparting additive free from the above problems, namely, an excellent fire retardance-imparting additive.

The present inventors earnestly investigated the fire retardance of thermoplastic resins and consequently found that surprisingly, the addition of an aromatic vinyl resin having specific substituents to a thermoplastic resin greatly improves the fire retardance, whereby the present invention has been accomplished.

That is, the present invention provides a fire retardance-imparting additive that comprises a substituted aromatic vinyl resin having acid salt groups as the substituents on the aromatic rings and comprises a structure represented by the following formula 1:

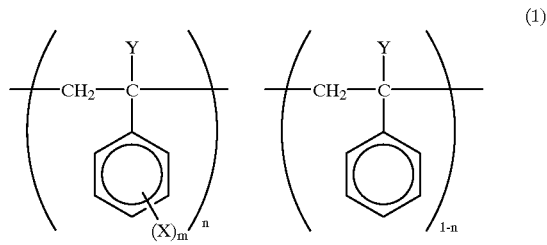

(1)

wherein X is an acid salt group, m is 1 to 5, Y is a hydrogen atom or a hydrocarbon group of 1 to 10 carbon atoms, and n is a molar fraction chosen in a range of $0 < n \leq 1$.

DESCRIPTION OF PREFERRED EMBODIMENTS OF THE INVENTION

Figure 1:
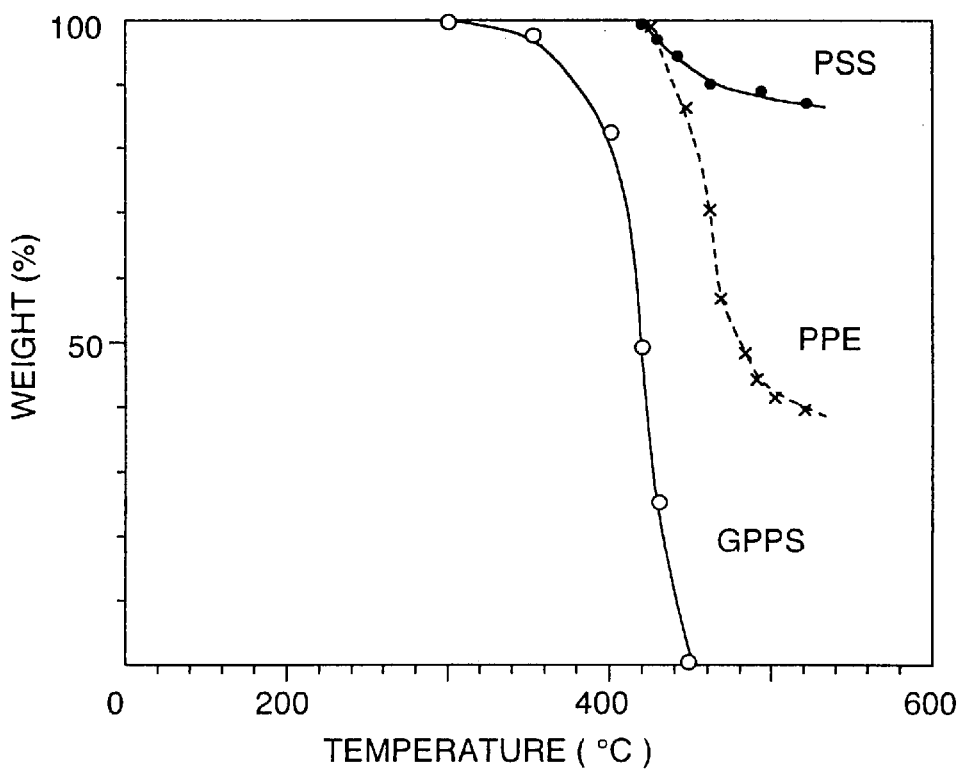
FIG. 1 shows pyrolytic behaviors of components determined by thermogravimetric analysis (TGA method).
Figure 1:
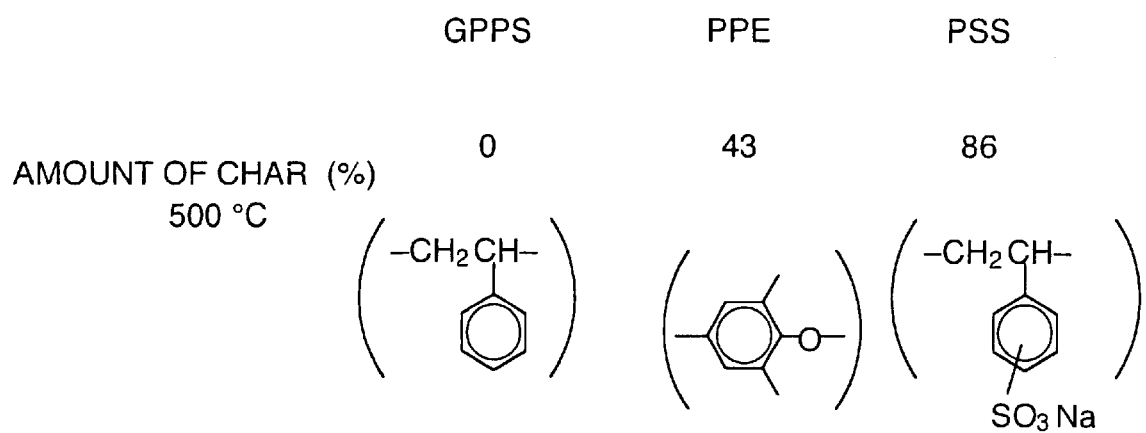

The fire retardance-imparting additive (A) of the present invention can be blended with at least one thermo-plastic resin (B), and a fire retardant (C) can also be blended with them if necessary.

The above-mentioned component (A) or (B) is the main component of the fire-retardant resin composition of the present invention and both of the components (A) and (B) have a function of maintaining the strength of a molded product. The component (B) is for imparting a good thermoplasticity to the resin composition. The components (A) and (C) are for imparting fire retardance to the resin component.

Here, it is important that the component (A) be a substituted aromatic vinyl resin having acid salt groups as the substituents. The present inventors found that the acid salt groups, as the substituents on the aromatic rings, are relatively easy to remove, and become crosslinked points at the time of combustion to contribute to the formation of char, and that the removed inorganic acid accelerates the char formation, whereby the present invention has been accomplished.

In the present invention, the fire retardance-imparting additive (A) is represented by the following formula 1:

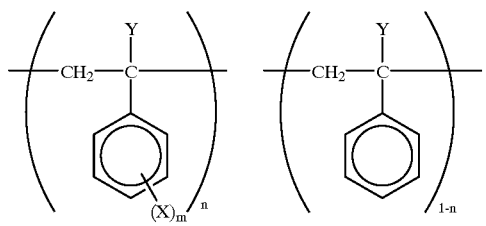

(1)

wherein X is an acid salt group, m is 1 to 5, Y is a hydrogen atom or a hydrocarbon group of 1 to 10 carbon atoms, and n is a molar fraction chosen in a range of $0 < n \leq 1$.

Here, the kind of the acid salt group as X is not particularly limited and the acid salt includes, for example, sulfonates, phosphates and borates. The inorganic acid salt described above is preferably an alkali metal salt, an alkaline earth metal salt, an ammonium salt or the like.

Y is not particularly limited so long as it is a hydrogen atom or a hydrocarbon group of 1 to 10 carbon atoms, though a hydrogen atom and a methyl group are especially preferable as Y.

The symbol n represents a molar fraction chosen in a range of $0 < n \leq 1$, preferably $0.3 \leq n \leq 1$, more preferably $0.5 \leq n \leq 1$.

In the present invention, the fire retardance-imparting additive (A) is preferably a polystyrene sulfonic acid metal salt. As the metal, sodium, aluminum, zinc, tin, etc. are suitably used. When the thermoplastic resin (B) is a styrene resin, the fire retardance-imparting additive (A) is more preferably a copolymer of sodium styrene sulfonate and styrene.

In the present invention, the thermoplastic resin (B) is an aromatic vinyl resin other than the fire retardance-imparting additive (A) used and is not particularly limited so long as it is miscible with the components (A) and (C) or is uniformly dispersible together with them. As the thermoplastic resin (B), resins of polystyrene type, polyphenylene ether type, polyolefin type, polyvinyl chloride type, polyamide type, polyester type, polyphenylene sulfide type, polycarbonate type, polymethacrylate type and the like can be used singly or as a mixture thereof. The resins of polyphenylene ether type, polystyrene type and polycarbonate type are especially preferable as the thermoplastic resin (B).

A styrene resin (B-1) as an example of the above-mentioned thermoplastic resin (B) is composed of a rubber-modified styrene resin and/or a rubber-unmodified styrene resin. In particular, it is preferably composed of a rubber-modified styrene resin alone or composed of a rubber-modified styrene resin and a rubber-unmodified styrene resin. The styrene resin (B-1) is not particularly limited so long as it is miscible with the components (A) to (C) or is uniformly dispersible together with them.

The rubber-modified styrene resin refers to a polymer composed of an aromatic vinyl polymer matrix and a rubber-like polymer dispersed therein as particles, and it is obtained by subjecting a monomer mixture of one or more aromatic vinyl monomers and optionally one or more vinyl monomers copolymerizable therewith to polymerization in the presence of a rubber-like polymer by a well-known method such as block polymerization, emulsion polymerization, suspension polymerization or the like.

Such a styrene resin (B-1) includes, for example, impact-resistant polystyrenes, acrylonitrile-butadiene-styrene copolymers (ABS resins), acrylonitrile-acrylic rubber-styrene copolymers (AAS resins), and acrylonitrile-ethylene propylene rubber-styrene copolymers (AES resins).

The above-mentioned rubber-like polymer has a glass transition temperature (Tg) of preferably −30° C. or lower. When the glass transition temperature is higher than −30° C., the impact resistance tends to be deteriorated.

Such a rubber-like polymer includes, for example, diene rubbers such as polybutadienes, poly(styrene-butadiene)s, poly(acrylonitrile-butadiene)s, etc.; saturated rubbers obtained by hydrogenating the above-exemplified diene rubbers; isoprene rubber; chloroprene rubber; acrylic rubbers such as polybutyl acrylates, etc.; and ethylene-propylene-diene monomer ternary copolymers (EPDM). The diene rubbers are especially preferable.

The rubber-modified styrene resin can be produced by subjecting a mixture of graft-polymerizable monomers to polymerization in the presence of the above-mentioned rubber-like polymer. In this case, the aromatic vinyl monomer as essential component in the above-mentioned monomer mixture is, for example, styrene, α-methylstyrene, p-methylstyrene or the like. Although styrene is the most preferable, the monomer mixture may contain any of the above-exemplified aromatic vinyl monomers other than styrene contained as main component.

If necessary, one or more other monomer components copolymerizable with the aromatic vinyl monomer(s) can be incorporated into the monomer mixture as a component for producing the rubber-modified styrene resin in the styrene resin (B-1). When the oil resistance should be improved, unsaturated nitrile monomers such as acrylonitrile, methacrylonitrile and the like can be used as the other monomer component(s).

When the melt viscosity at the time of blending should be reduced, acrylic esters containing an alkyl group of 1 to 8 carbon atoms can be used. When the heat resistance of the resin composition should be further improved, any of monomers such as α-methylstyrene, acrylic acid, methacrylic acid, maleic anhydride, N-substituted maleimide, etc. may be copolymerized.

The content of the other vinyl monomer(s) copolymerizable with the above-mentioned aromatic vinyl monomer(s) in the monomer mixture is 0 to 40 wt %.

The content of the rubber-like polymer in the rubber-modified styrene resin is preferably 5 to 80 wt %, more preferably 10 to 50 wt %, and the content of units derived from the graft-polymerizable monomer mixture in the rubber-modified styrene resin is preferably 95 to 20 wt %, more preferably 90 to 50 wt %. When the contents are in the above ranges, the desired resin composition has an improved balance between impact resistance and stiffness.

The rubber particle size of the rubber-like polymer is preferably 0.1 to 5.0 μm, in particular, 0.2 to 3.0 μm. When the particle size is in the above range, the impact resistance is particularly improved.

The reduced viscosity $\eta_{sp}/c$ (0.5 g/dl, measured at 30° C., solvent: toluene in the case where the matrix resin is a polystyrene, or methyl ethyl ketone in the case where the matrix resin is an unsaturated nitrile-aromatic vinyl copolymer) of the resin portion of the rubber-modified styrene resin, a measure of the molecular weight of the rubber-modified styrene resin, ranges preferably from 0.30 to 0.80 dl/g, more preferably from 0.40 to 0.60 dl/g. As a means for controlling the reduced viscosity $\eta_{sp}/c$ of the rubber-modified styrene resin so that it may satisfy the above requirement, the adjustment of the amount of a polymerization initiator, the polymerization temperature and the amount of a chain transfer agent, etc. can be mentioned.

In the present invention, a polyphenylene ether (B-2) as another example of the above-mentioned thermo-plastic resin (B) is composed of a homopolymer and/or a copolymer which comprise repeating units represented by the following formula 2:

(2)

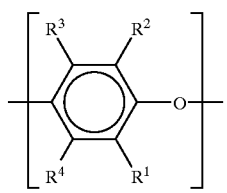

wherein $R^1$, $R^2$, $R^3$ and $R^4$, which may be the same or different, are selected from the group consisting of hydrogen atom, hydrocarbon groups and substituted hydrocarbon groups.

Preferable specific examples of the polyphenylene ether are poly(2,6-dimethyl-1,4-phenylene ether)s, copolymers of 2,6-dimethylphenol and 2,3,6-trimethylphenol, etc. Of these, the poly(2,6-dimethyl-1,4-phenylene ether)s are more preferable. A process for producing such a polyphenylene ether is not particularly limited, and the polyphenylene ether can easily be produced by oxidation polymerization of, for example, 2,6-xylenol by the use of a complex of a cuprous salt and an amine as a catalyst according to the process disclosed in the specification of U.S. Pat. No. 3,306,874. The polyphenylene ether can easily be produced also by any of the processes disclosed in the specification of U.S. Pat. No. 3,306,875, the specification of U.S. Pat. No. 3,257,357, the specification of U.S. Pat. No. 3,257,358, JP-B-52-17880 and JP-A-50-51197. The reduced viscosity $\eta_{sp}/c$ (0.5 g/dl, a chloroform solution, measured at 30° C.) of the above-mentioned polyphenylene ether used in the present invention ranges preferably from 0.20 to 0.70 dl/g, more preferably from 0.30 to 0.60 dl/g. As a means for controlling the reduced viscosity $\eta_{sp}/c$ of the polyphenylene ether so that it may satisfy the above requirement, the adjustment of the amount of the catalyst in the above-mentioned production of the polyphenylene ether, etc. can be mentioned.

In the present invention, a preferable combination of thermoplastic resins is a resin component consisting of (B-1) and (B-2). The content of (B-1) in the resin component is 1 to 99 wt %, preferably 1 to 50 wt %, more preferably 3 to 40 wt %, most preferably 5 to 25 wt %.

An aromatic polycarbonate as still another example of the thermoplastic resin (B) in the present invention can be selected from aromatic homopolycarbonates and aromatic copolycarbonates. As a process for producing the aromatic polycarbonate, there can be mentioned a phosgene process comprising blowing phosgene through a bifunctional phenolic compound in the presence of a caustic alkali and a solvent, and a transesterification process comprising, for example, carrying out transesterification between a bifunctional phenolic compound and diethyl carbonate in the presence of a catalyst. The viscosity-average molecular weight of said aromatic polycarbonate ranges preferably from 10,000 to 100,000. The above-mentioned bifunctional phenolic compound includes 2,2'-bis(4-hydroxyphenyl) propane, 2,2'-bis(4-hydroxy-3,5-dimethylphenyl)propane, bis(4-hydroxyphenyl)methane, 1,1'-bis(4-hydroxyphenyl) ethane, 2,2'-bis(4-hydroxyphenyl)butane, 2,2'-bis(4-hydroxy-3,5-diphenyl)butane, 2,2'-bis(4-hydroxy-3,5-dipropylphenyl)propane, 1,1'-bis(4-hydroxyphenyl) cyclohexane, 1-phenyl-1,1'-bis(4-hydroxyphenyl)ethane, etc. In particular, 2,2'-bis(4-hydroxyphenyl)propane, i.e., bisphenol A is preferable. In the present invention, these bifunctional phenolic compounds may be used singly or in combination.

In the present invention, the fire retardant (C) is a halogen-containing, phosphorus-containing or inorganic fire retardant.

The halogen-containing fire retardant includes halogenated bisphenols, aromatic halides, halogenated polycarbonates, halogenated aromatic vinyl polymers, halogenated cyanurate resins, halogenated polyphenylene ethers, etc. Preferable examples thereof are decabromodiphenyl oxide, tetrabromobisphenol A, oligomers of tetrabromobisphenol A, brominated bisphenol-based phenoxy resins, brominated bisphenol-based polycarbonates, brominated polystyrenes, brominated crosslinked polystyrenes, brominated polyphenylene oxides, polydibromophenylene oxides, decabromodiphenyl oxide-bisphenol condensation products, halogen-containing phosphoric esters, fluororesins, etc.

The phosphorus-containing fire retardant includes organophosphorus compounds, red phosphorus, inorganic phosphates, etc. The organophosphorus compounds include phosphine, phosphine oxide, biphosphine, phosphonium salts, phosphinic acid salts, phosphoric esters, phosphonic esters, etc. Specific examples thereof are triphenyl phosphate, methylneopentyl phosphite, pentaerythritol diethyldiphosphite, methylneopentyl phosphonate, phenylneopentyl phosphate, pentaerythritol diphenyldiphosphate, dicyclopentyl hypodiphosphate, dineopentyl hypophosphite, phenylpyrocatechol phosphite, ethylpyrocatechol phosphate, and dipyrocatechol hypodiphosphate.

Aromatic phosphoric ester monomers (formula 3) and aromatic phosphoric ester condensation products (formula 4) are especially preferable as the organophosphorus compounds:

(3)

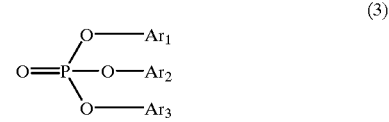

(4)

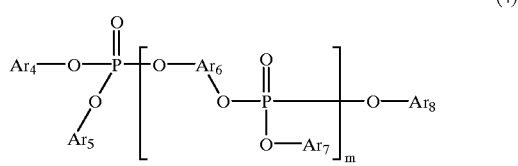

wherein $Ar_1$, $Ar_2$, $Ar_3$, $Ar_4$, $Ar_5$, $Ar_7$ and $Ar_8$ are independently an unsaturated phenyl group or an aromatic group selected from substituted phenyl groups obtained by replacing at least one of the hydrogen atoms of a phenyl group with a hydrocarbon group of 1 to 10 carbon atoms, $Ar_6$ is a divalent aromatic group of 6 to 20 carbon atoms, and m is an integer of 1 or more.

Of the above-mentioned aromatic phosphoric ester monomers, preferable are hydroxyl-containing aromatic phosphoric ester monomers such as phosphoric ester monomers obtained by introducing one or more phenolic hydroxyl groups into tricresyl phosphate, triphenyl phosphate or the like, or aromatic phosphoric ester monomers represented by the formula 5:

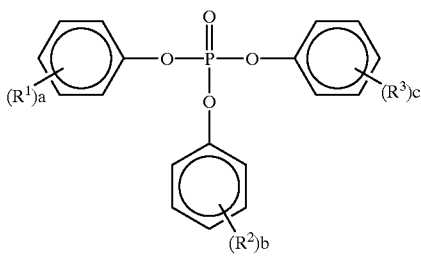

(5)

wherein each of a, b and c is an integer of 1 to 3, and each of $R^1$, $R^2$ and $R^3$ is a hydrogen atom or an alkyl group of 1 to 30 carbon atoms, the total number of carbon atoms of the substituents $R^1$, $R^2$ and $R^3$ in the whole compound being 12 to 30 on average, provided that when the aromatic phosphoric ester monomer is composed of a plurality of aromatic phosphoric esters having different substituents, the total number of carbon atoms of the substituents $R^1$, $R^2$ and $R^3$ in said fire retardant is expressed as the number average, i.e., the sum of the products of the weight fraction of each aromatic phosphoric ester component in said fire retardant and the total number of carbon atoms of the substituents of said component.

In these aromatic phosphoric ester monomers, the total number of the substituents $R^1$, $R^2$ and $R^3$ expressed as the number average is preferably 15 to 30, more preferably 20 to 30, most preferably 25 to 30.

Specific examples of the substituents are nonyl group, butyl groups (e.g. t-butyl group), t-amyl group, hexyl group, cyclohexyl group, heptyl group, octyl group, decyl group, undecyl group, dodecyl group, tridecyl group, tetradecyl group, pentadecyl group, hexadecyl group, heptadecyl group, octadecyl group, nonadecyl group, octadodecyl group, etc. The aromatic phosphoric ester monomer having such substituents can be produced by any of the well-known processes disclosed in JP-A-1-95149, JP-A-3-294284, etc. The processes include, for example, a process comprising reacting an alkylphenol with phosphorus oxychloride with heating in the presence of anhydrous aluminum chloride as a catalyst, and a process comprising oxidizing a phosphonic triester with oxygen into a corresponding aromatic phosphoric ester.

As the above-mentioned aromatic phosphoric ester condensation products, bisphenol A bis(diphenylphosphate), bisphenol A bis(dicresylphosphate), etc. are especially preferable.

Other preferable aromatic phosphoric ester condensation products used as the fire retardant (C) in the present invention are represented by the formula 6:

wherein each of a, b, c, d and e is an integer of 0 to 3, each of $R^1$ through $R^6$ is a hydrocarbon group of 1 to 10 carbon atoms, and n is an integer of 1 to 3.

Aromatic phosphoric ester condensation products having substituents at the 2- and 6-positions are especially preferable and can be produced by the well-known process disclosed in JP-A-5-1079, etc. This process includes, for example, a process comprising reacting a monofunctional phenol having substituents at the 2- and 6-positions with a phosphorus oxyhalide in the presence of a Lewis acid catalyst to obtain a diaryl phosphorohalide, and then reacting the diaryl phosphorohalide with a bifunctional phenol in the presence of a Lewis acid catalyst.

Red phosphorus as an example of the phosphorus-containing fire retardant includes, for example, ordinary red phosphorus; red phosphorus previously coated with a film of a metal hydroxide selected from aluminum hydroxide, magnesium hydroxide, zinc hydroxide and titanium hydroxide; red phosphorus previously coated with a film made of a thermosetting resin and a metal hydroxide selected from aluminum hydroxide, magnesium hydroxide, zinc hydroxide and titanium hydroxide; and red phosphorus previously double coated with a film of a metal hydroxide selected from aluminum hydroxide, magnesium hydroxide, zinc hydroxide and titanium hydroxide, and a film of a thermosetting resin thereon.

The inorganic phosphates as examples of the phosphorus-containing fire retardant are represented by ammonium polyphosphates.

The inorganic fire retardant includes aluminum hydroxide, magnesium hydroxide, dolomite, hydrotalcite, calcium hydroxide, barium hydroxide, basic magnesium carbonate, zirconium hydroxide, hydrates of inorganic metal compounds (e.g. hydrates of tin oxide), zinc borate, zinc metaborate, barium metaborate, zinc carbonate, magnesium carbonate, Moo calcium, calcium carbonate, barium carbonate, etc. These may be used singly or in combination. Of these, one or more compounds selected from the group consisting of magnesium hydroxide, aluminum hydroxide, basic magnesium carbonate and hydrotalcite have satisfactory fire-retardant effect and economical benefit.

When the fire retardant (C) is added in the present invention, its adding amount is 1 to 100 parts by weight, preferably 1 to 50 parts by weight, more preferably 3 to 20 parts by weight, most preferably 5 to 15 parts by weight, per 100 parts by weight in total of the resin components, i.e., the fire retardance-imparting additive (A) and the thermoplastic resin(s) (B).

In the present invention, when the fire retardance and the heat resistance should be further improved, a novolak resin (D) may be incorporated. When used together with an aromatic phosphoric ester, the novolak resin (D) serves also as an agent for improving the fluidity and the heat resistance

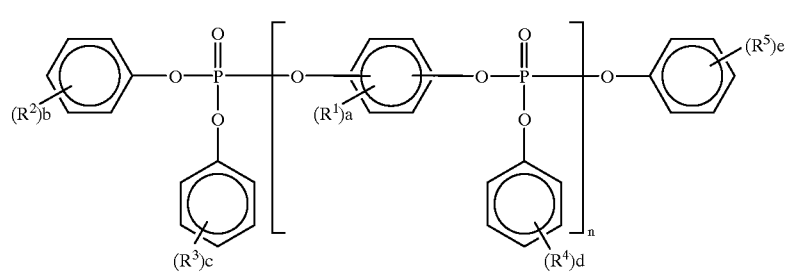

(6)

and slightly decreases the miscibility of the resin components with the aromatic phosphoric ester. The novolak resin is a thermoplastic resin obtained by condensing a phenol with an aldehyde in the presence of an acid catalyst such as sulfuric acid or hydrochloric acid.

An example of production of the novolak resin is represented by the formulas (7):

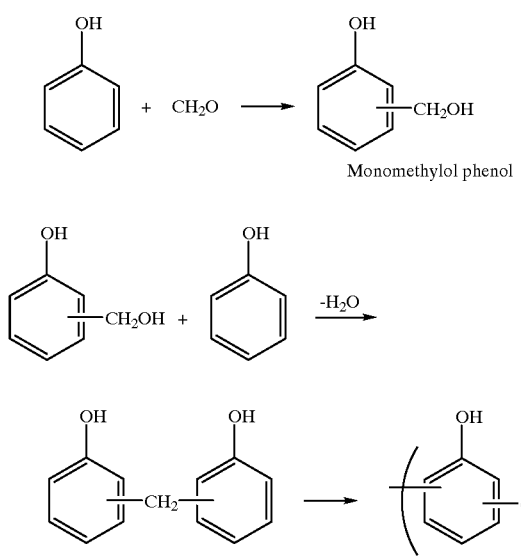

(7)

Monomethylol phenol

The above-mentioned phenol includes phenol; o-cresol; m-cresol; p-cresol; 2,5-dimethyl-, 3,5-dimethyl-, 2,3,5-trimethyl-, 3,4,5-trimethyl-, p-t-butyl-, p-n-octyl-, p-stearyl-, p-phenyl-, p-(2-phenylethyl)-, o-isopropyl-, p-isopropyl-, m-isopropyl-, p-methoxy- or p-phenoxyphenol; pyrocatechol; resorcinol; hydroquinone; salicylaldehyde; salicylic acid; p-hydroxybenzoic acid; methyl p-hydroxybenzoate; p-cyano- or o-cyanophenol; p-hydroxybenzene-sulfonic acid; p-hydroxybenzenesulfonamide; cyclohexyl p-hydroxybenzenesulfonate; 4-hydroxyphenylphenylphosphinic acid; methyl 4-hydroxyphenyphenylphosphinate; 4-hydroxyphenylphosphonic acid; ethyl 4-hydroxyphenylphosphonate; diphenyl 4-hydroxyphenylphosphonate; etc.

The above-mentioned aldehyde includes formaldehyde, acetaldehyde, n-propanal, n-butanal, isopropanal, isobutyraldehyde, 3-methyl-n-butanal, benzaldehyde, p-tolyl aldehyde, 2-phenylacetaldehyde, etc.

In the present invention, a mold release agent (E) may be incorporated if necessary. As the mold release agent (E), there are used, for example, one or more compounds selected from saturated higher aliphatic carboxylic acids or their metal salts, carboxylic acid ester-based waxes, organosiloxane-based waxes, polyolefin wax, and polycaprolactones. It is preferable to use one or more compounds selected from the saturated higher aliphatic carboxylic acids or their metal salts.

As the higher aliphatic carboxylic acids, straight-chain saturated monocarboxylic acids of 12 to 42 carbon atoms are preferable. The higher aliphatic carboxylic acids include, for example, lauric acid, myristic acid, palmitic acid, stearic acid, behenic acid and montanic acid. The metals of the metal salts of the higher aliphatic carboxylic acids include lithium, sodium, potassium, magnesium, calcium, aluminum, zinc, etc. As the metal salts, zinc stearate, magnesium stearate, calcium stearate and aluminum stearate are especially preferable.

When the mold release agent (E) is incorporated, its amount is preferably 0.01 to 5 parts by weight, more preferably 0.1 to 5 parts by weight, most preferably 0.3 to 1 part by weight, per 100 parts by weight in total of the resin components, i.e., the fire retardance-imparting additive (A) and the thermoplastic resin(s) (B).

In the present invention, one or more fire-retarding assistants (F) selected from triazine-skeleton-containing compounds, metal-containing compounds, silicone resins, silicone oil, silica, aramide fiber, polyacrylonitrile fiber and fluororesins may be incorporated if necessary.

The amount of the fire-retarding assistant(s) (F) is preferably 0.001 to 40 parts by weight, more preferably 1 to 20 parts by weight, most preferably 5 to 10 parts by weight, per 100 parts by weight in total of the resin components, i.e., the fire retardance-imparting additive (A) and the thermoplastic resin(s) (B).

The triazine-skeleton-containing compound as the fire-retarding assistant (F) is a component used for further improving the fire retardance as a fire-retarding assistant for the phosphorus-containing fire retardant. Specific examples thereof are melamine, melam (the formula 8), melem (the formula 9), mellon (a product obtained by elimination of three molecules of ammonia from three molecules of melem at 600° C. or higher), melamine cyanurate (the formula 10), melamine phosphate (the formula 11), succinoguanamine (the formula 12), adipoguanamine, methylglutaroguanamine, melamine resins (the formula 13) and BT resins (the formula 14). Melamine cyanurate is especially preferable because of its low volatility.

(8)

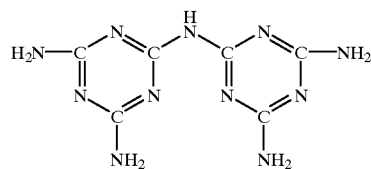

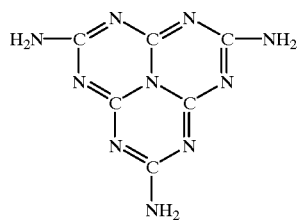 (9)

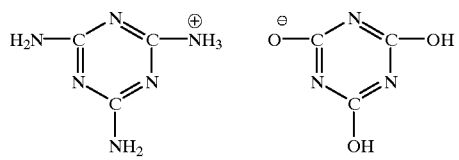 (10)

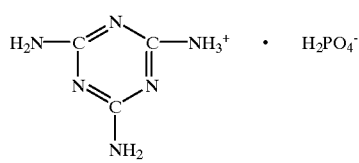 (11)

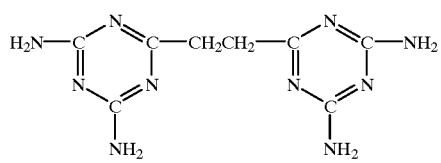 (12)

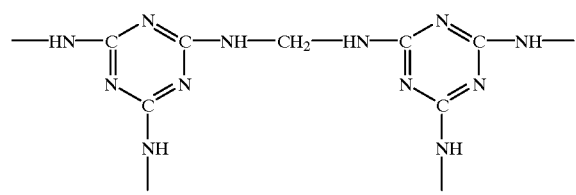 (13)

(14)

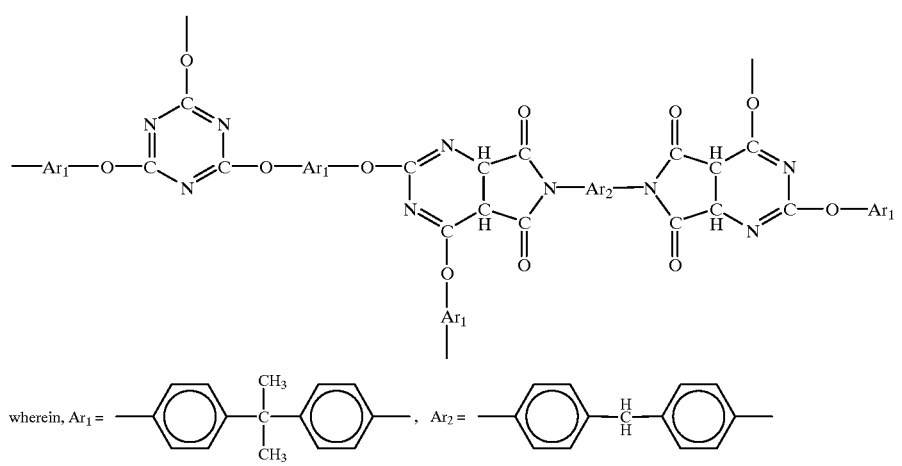

As the metal-containing compound as the fire-retarding assistant (F), a metal oxide or metal powder, or both are used. Said metal oxide is a simple substance or complex (alloy) of aluminum oxide, iron oxide, titanium oxide, manganese oxide, magnesium oxide, zirconium oxide, zinc oxide, molybdenum oxide, cobalt oxide, bismuth oxide, chromium oxide, tin oxide, antimony oxide, nickel oxide, copper oxide, tungsten oxide, etc. Said metal powder is a simple substance or complex of aluminum, iron, titanium, manganese, zinc, molybdenum, cobalt, bismuth, chromium, nickel, copper, tungsten, tin, antimony, etc.

The silicone resin as the fire-retarding assistant (F) has a three-dimensional network structure formed by combination of structural units of $SiO_2$, $RSiO_{3/2}$, $R_2SiO$ or $R_3SiO_{1/2}$. Here, R is an alkyl group such as methyl, ethyl or propyl; an aromatic group such as phenyl or benzyl; or a substituent formed by introducing a vinyl group into any of the above-exemplified substituents. Silicone resins containing vinyl groups are especially preferable. Such a silicone resin can be obtained by co-hydrolyzing organohalosilanes corresponding to the above-mentioned structural units, followed by polymerization.

The silicone oil as the fire-retarding assistant (F) is a polydiorganosiloxane, and in particular, a vinyl-containing silicone oil is preferable. The silicone oil comprises repeating units represented by the formula 15:

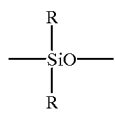

(15)

In the above formula, Rs are one or more kinds of substituents selected from alkyl groups of 1 to 8 carbon atoms, aryl groups of 6 to 13 carbon atoms, and vinyl-containing groups represented by the formula 16 or the formula 17, and such substituents containing a vinyl group are especially preferable.

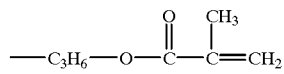

(16)

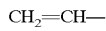 (17)

The viscosity of the above-mentioned vinyl-containing silicone oil is preferably 600 to 1000000 centistokes (25° C.), more preferably 90000 to 150000 centistokes (25° C.).

The silica as the fire-retarding assistant (F) is amorphous silicon dioxide. In particular, it is preferably silica coated with a hydrocarbon type compound which is obtained by treating silica surface with a silane coupling agent containing the hydrocarbon type compound as a base, and it is more preferably silica coated with a hydrocarbon type compound containing a vinyl group. The above-mentioned silane coupling agent includes vinyl-containing silanes such as p-styryltrimethoxysilane, vinyltrichlorosilane, vinyltris(β-methoxyethoxy)silane, vinyltriethoxysilane, vinyltrimethoxysilane, γ-methacryloxypropyltrimethoxysilane, etc.; epoxysilanes such as -(3,4-epoxycyclohexyl)ethyltrimethoxysilane, γ-glycidoxypropyltrimethoxysilane, γ-glycidoxypropyltriethoxysilane, etc.; and aminosilanes such as N-β-(aminoethyl) γ-aminopropyltrimethoxysilane, N-β-(aminoethyl) γ-aminopropylmethyldimethoxysilane, γ-aminopropyltriethoxysilane, N-phenyl-γ-aminopropyltrimethoxysilane, etc. of these, silane coupling agents having a structural unit similar to those of the thermoplastic resin(s) are especially preferable. For example, p-styryltrimethoxysilane is suitable for styrene resins.

Methods for treating silica surface with the silane coupling agent are broadly classified into a wet method and a dry method. The wet method comprises treating silica in a silane coupling agent solution, followed by drying. The dry method comprises charging silica into an apparatus which permits high-speed stirring, such as a Henschel mixer, and slowly dropping a silane coupling agent solution onto the silica with stirring, followed by heat treatment.

The aramide fiber as the fire-retarding assistant (F) preferably has an average diameter of 1 to 500 μm and an average fiber length of 0.1 to 10 mm, and can be produced by dissolving isophthalamide or a poly(p-phenyleneterephthalamide) in an amide polar solvent or sulfuric acid, followed by wet or dry spinning of the solution.

The polyacrylonitrile fiber as the fire-retarding assistant (F) preferably has an average diameter of 1 to 500 μm and an average fiber length of 0.1 to 10 mm, and is produced by either a dry spinning process comprising dissolving a polymer in a solvent such as dimethylformamide, followed by dry spinning in an air stream at 400° C., or a wet spinning process comprising dissolving a polymer in a solvent such as nitric acid, followed by wet spinning in water.

The fluororesin as the fire-retarding assistant (F) is a resin containing fluorine atoms. Specific examples thereof are polymonofluoroethylenes, polydifluoroethylenes, polytrifluoroethylenes, polytetrafluoroethylenes, tetrafluoroethylene/hexafluoropropylene copolymers, etc. If necessary, copolymers of any of the fluorine-containing monomers for these polymers and a monomer copolymerizable therewith may be used.

The specification of U.S. Pat. No. 2,393,697 and the specification of U.S. Pat. No. 2,534,058 disclose processes for production of these fluororesins. For example, polytetrafluoroethylene powder is obtained by polymerizing tetrafluoroethylene in an aqueous medium under a pressure of 7 to 70 kg/cm$^2$ and at a temperature of 0 to 200° C. by the use of a free-radical initiator such as ammonium persulfate or potassium persulfate, followed by coagulation or precipitation from the resulting suspension, dispersion or emulsion.

As a process for incorporating the fluororesin, there are a two-stage process comprising melt-kneading the fluororesin, the thermoplastic resin(s) and optionally a dispersant to prepare a master batch, and melt-kneading the master batch with the thermoplastic resin(s) and the fire retardant; a one-stage process using an extruder composed of two zones which permits side feed, which process comprises melt-kneading the thermoplastic resin(s), the fluororesin and optionally a dispersant at first, and then lowering the melting temperature and feeding the fire retardant, followed by melt-kneading; and a one-stage process comprising feeding all components including the fluororesin, into a main feeder, and melt-kneading them. Of these, the two-stage process comprising preparing the master batch is preferable from the viewpoint of fire retardance.

In the present invention, one or more fluidity improvers (G) selected from copolymer resins comprising aromatic vinyl units and acrylic ester units, aliphatic hydrocarbons, higher fatty acids, higher fatty acid esters, higher fatty acid amides, higher aliphatic alcohols, and metal soaps may be incorporated if necessary.

When the fluidity improver(s) (G) is incorporated, the amount thereof is preferably 0. 1 to 20 parts by weight, more preferably 0.5 to 10 parts by weight, most preferably 1 to 5 parts by weight, per 100 parts by weight in total of the resin components, i.e., the fire retardance-imparting additive (A) and the thermoplastic resin(s) (B).

The aromatic vinyl units of the copolymer resin as the fluidity improver (G) are, for example, units of styrene, α-methylstyrene, p-methylstyrene, p-chlorostyrene, p-bromostyrene, 2,4,5-tribromostyrene, or the like, and are most preferably styrene units. The copolymer resin may also be that obtained by copolymerizing styrene as a main component with any of the other aromatic vinyl monomers exemplified above. The acrylic ester units are units of an acrylic ester containing an alkyl group of 1 to 8 carbon atoms, such as methyl acrylate, butyl acrylate or the like. The content of the acrylic ester units in the copolymer resin is preferably 3 to 40 wt %, more preferably 5 to 20 wt %. The viscosity of a solution of the above-mentioned copolymer resin (a MEK solution having a resin concentration of 10 wt %, measuring temperature 25° C.), an indication of the molecular weight of the copolymer resin, is preferably 2 to 10 cP (centipoise). When the solution viscosity is less than 2 cP, the impact strength is decreased. On the other hand, when the solution viscosity is more than 10 cP, the fluidity-improving effect is lessened.

The aliphatic hydrocarbon type processing aids as the fluidity improver (G) include, for example, liquid paraffin, natural paraffin, microcrystalline wax, polyolefin wax, synthetic paraffin, and their partially oxidized products, fluorides, chlorides and the like.

The higher fatty acids as the fluidity improver (G) include, for example, saturated fatty acids other than those exemplified as the mold release agent (E), and unsaturated fatty acids such as ricinolic acid, ricin veraidinic acid, 9-oxy-12-octadecenoic acid, etc.

The higher fatty acid esters as the fluidity improver (G) include, for example, monohydric alcohol esters of fatty acids, such as methyl phenylstearate, butyl phenylstearate, etc.; monohydric alcohol esters of polybasic acids, such as phthalic acid diesters (e.g. diphenylstearyl phthalate), etc.; sorbitan esters such as sorbitan monolaurate, sorbitan monostearate, sorbitan monooleate, sorbitan sesquioleate, sorbitan trioleate, polyoxyethylene sorbitan monolaurate, polyoxyethylene sorbitan monopalmitate, polyoxyethylene sorbitan monostearate, polyoxyethylene sorbitan monooleate, etc.; fatty acid esters of glycerol monomers, such as stearic acid monoglyceride, oleic acid monoglyceride, capric acid monoglyceride, behenic acid monoglyceride, etc.; fatty acid esters of polyglycerols, such as polyglycerol stearic acid esters, polyglycerol oleic acid esters, polyglycerol lauric acid esters, etc.; fatty acid esters having a polyalkylene ether unit, such as polyoxyethylene monolaurate, polyoxyethylene monostearate, polyoxyethylene monooleate, etc.; and neopentyl polyol fatty acid esters such as neopentyl polyol distearic acid esters, etc.

The higher fatty acid amides as the fluidity improver (G) include, for example, monoamides of saturated fatty acids, such as phenylstearamide, methylolstearamide, methylolbehenamide, etc.; N,N'-di-substituted monoamides such as coconut oil fatty acid diethanolamides, lauric acid diethanolamide, coconut oil fatty acid diethanolamides, oleic acid diethanolamide, etc.; saturated fatty acid bisamides such as methylene bis(12-hydroxyphenyl)stearamide, ethylene bisstearamide, ethylene bis(12-hydroxyphenyl) stearamide, hexamethylene bis(12-hydroxyphenyl) stearamide, etc.; and aromatic bisamides such as m-xylylene bis(12-hydroxyphenyl)stearamide, etc.

The higher aliphatic alcohols as the fluidity improver (G) include monohydric alcohols such as stearyl alcohol, cetyl alcohol, etc.; polyhydric alcohols such as sorbitol, mannitol, etc.; polyoxyethylenedodecylamine; polyoxyethyleneoctadecylamine; allylated ethers having a polyalkylene ether unit, such as polyoxyethylene allylated ethers, etc.; polyoxyethylene alkyl ethers such as polyoxyethylene lauryl ethers, polyoxyethylene tridecyl ethers, polyoxyethylene cetyl ethers, polyoxyethylene stearyl ethers, polyoxyethylene oleyl ethers, etc.; polyoxyethylene alkyphenyl ethers such as polyoxyethylene octylphenyl ethers, polyoxyethylene nonylphenyl ethers, etc.; and dihydric alcohols having a polyalkylene ether unit, such as polyepichlorohydrin ethers, polyoxyethylene bisphenol A ethers, polyoxyethylene ethylene glycols, polyoxypropylene bisphenol A ethers, polyoxyethylene polyoxypropylene glycol ethers, etc.

The metal soaps as the fluidity improver (G) are salts of the higher fatty acids exemplified above (e.g. stearic acid) with metals such as barium, calcium, zinc, aluminum, magnesium, etc.

In the present invention, a thermoplastic elastomer (H) may be incorporated if necessary. The thermoplastic elastomer (H) includes, for example, those of polystyrene type, polyolefin type, polyester type, polyurethane type, 1,2-polybutadiene type, and polyvinyl chloride type. The polystyrene type thermoplastic elastomers are especially preferable.

The amount of the thermoplastic elastomer (H) is preferably 0.5 to 20 parts by weight, more preferably 1 to 10 parts by weight, most preferably 2 to 5 parts by weight, per 100 parts by weight in total of the resin components, i.e., the fire retardance-imparting additive (A) and the thermoplastic resin(s) (B).

The above-mentioned polystyrene type thermo-plastic elastomers are block copolymers comprising aromatic vinyl units and conjugated diene units, or block copolymers comprising aromatic vinyl units and partly hydrogenated conjugated diene units.

The aromatic vinyl monomer for producing the aforesaid block copolymer is, for example, styrene, α-methylstyrene, p-methylstyrene, p-chlorostyrene, p-bromostyrene or 2,4,5-tribromostyrene, and is most preferably styrene. The block polymer may be that obtained by copolymerizing styrene as a main aromatic monomer with any of the other aromatic vinyl monomers exemplified above.

The conjugated diene monomer for producing the aforesaid block copolymer includes 1,3-butadiene, isoprene, etc.

As to the block structure of the block copolymer, when a polymer block composed of aromatic vinyl units is represented by S and a polymer block composed of conjugated diene units and/or partly hydrogenated conjugated diene units is represented by B, the block copolymer is preferably a linear block copolymer represented by SB, S(BS)n (wherein n is an integer of 1 to 3) or S(BSB)n (wherein n is an integer of 1 or 2), or a star block copolymer comprising B portions as bonding centers which is represented by (SB)nX (wherein n is an integer of 3 to 6, and X is a coupling agent residue such as silicon tetrachloride, tin tetrachloride, a polyepoxy compound or the like). Of such block copolymers, linear block copolymers of the two-block type SB, the three-block type SBS and the four-block type SBSB are preferable.

In the present invention, when light resistance is required, one or more light resistance improvers (I) selected from ultraviolet absorbers, hindered amine type light stabilizers, antioxidants, halogen-capturing agents, light screens, metal deactivators and quenchers may be incorporated if necessary.

The amount of the light resistance improver(s) (I) is preferably 0.05 to 20 parts by weight, more preferably 0.1 to 10 parts by weight, most preferably 1 to 5 parts by weight, per 100 parts by weight in total of the resin components, i.e., the fire retardance-imparting additive (A) and the thermoplastic resin(s) (B).

A preferable example of make-up of a thermo-plastic resin composition containing the fire retardance-imparting additive of the present invention is as follows: 1 to 50 parts by weight of (A) a polystyrene sulfonic acid sodium salt and/or a copolymer of sodium styrene sulfonate and styrene, and 99 to 50 parts by weight of (B) a rubber-modified styrene resin. The composition having the above make-up is excellent in both fire retardance and thermo-plasticity.

The thus obtained composition can be continuously molded or shaped for a long period of time with, for example, an injection molding machine or an extruder, and the resulting molded or shaped material is excellent in fire retardance, fluidity, heat resistance and impact resistance.

The present invention is illustrated below in further detail with the following examples, which should not be construed as limiting the scope of the invention.

Measurements in Examples and Comparative Examples were carried out by employing the following methods or measuring apparatus.

(1) Amount of Char Produced (Thermogravimetric Analysis: TGA Method)

The temperature was raised at a rate of 40° C./min in a nitrogen stream by means of a Shimadzu thermal analyzer Model DT-40 manufactured by Shimadzu Corp., Japan, and the residue (%) at 500° C. was used as a measure of the amount of char produced.

(2) Fire Retardance

Self-extinguishing properties were evaluated by a VB (Vertical Burning) method according to UL-94 (a test piece of ⅛ inch in thickness).

As the components used in Examples and Comparative Examples, the following were used.

(a) Production of a Polystyrene Sulfonic Acid Sodium Salt (PSS)

According to the production process described in H. Tomita and R.A. Register, Macromolecules, 26 (11), 2796 (1993), a mixture of concentrated sulfuric acid and acetic anhydride was added to a solution of a polystyrene in dichloroethane, and the reaction was carried out at 60° C. for 5 hours to produce a polystyrene sulfonic acid, which was neutralized with sodium hydroxide used in an amount equimolar with the sulfonic acid groups. The resulting polystyrene sulfonic acid sodium salt had a degree of sulfonation of 100% and a weight average molecular weight of 14000 (this sodium salt is hereinafter referred to as PSS).

(b) Styrene Resin

A polystyrene having a weight average molecular weight of 200,000 (mfd. by Asahi Kasei Kogyo K.K.) (hereinafter referred to as GPPS) was used.

(c) Polyphenylene Ether (PPE)

A poly(oxy-2,6-dimethyl-4-phenylene) having a reduced viscosity $\eta_{sp}/c$ of 0.41 dl/g (mfd. by Asahi Kasei Kogyo K.K.) (hereinafter referred to as PPE) was used.

(d) Aromatic Polycarbonate (PC)

A bisphenol A-based aromatic polycarbonate having a viscosity average molecular weight of 20,000 (hereinafter referred to as PC) was used.

(e) Phosphorus-containing Fire Retardant: Triphenyl Phosphate (TPP)

A commercially available aromatic phosphoric ester monomer (TPP, a trade name, mfd. by DAIHACHI CHEMICAL) (hereinafter referred to as TPP) was used.

EXAMPLES 1 to 3

Comparative Examples 1 to 3

Test pieces of ⅛ inch in thickness were prepared by compression molding, and subjected to evaluation of the amount of char produced, fire retardance and thermoplasticity. Each resin composition consisting of a plurality of components was obtained by mechanically mixing the components in the ratio shown in Table 1, and melting them at a melting temperature of 280° C. and a number of revolution of 50 rpm for 5 minutes with Laboplastmill manufactured by Toyo Seiki Seisaku-sho Co., Ltd. From the thus obtained resin compositions, test pieces of ⅛ inch in thickness were prepared by compression molding, and their fire retardance was evaluated. The results are shown in Table 1 and FIG. 1.

TABLE 1

| Item | Comparative Example 3 | Comparative Example 1 | Comparative Example 2 | Example 1 | Example 2 | Example 3 |
|---|---|---|---|---|---|---|
| Composition (weight ratio) | | | | | | |
| (A) PSS | | | | 90 | 10 | 10 |
| (B) GPPS | | 100 | | 10 | | |
| PPE | | | 100 | | 80 | |
| PC | 100 | | | | | 90 |
| (C) TPP | | | | 10 | | |
| Evaluation | | | | | | |
| Amount of char produced (%) | 31 | 0 | 43 | 71 | 65 | 51 |
| Fire retardance | Self-extinguishing | Completely combusted | Self-extinguishing | Self-extinguishing | Self-extinguishing | Self-extinguishing |

The fire retardance-imparting additive of the present invention exhibits an excellent fire retardance, and a resin composition containing this fire retardance-imparting additive is suitable for, for example, housings, chassis or parts of household appliances such as VTR, panel boards, television sets, audio players, capacitors, household plug sockets, radio cassette players, video cassettes, video disk players, air conditioners, humidifiers, electric hot air type heaters, etc.; housings, chassis or parts of office automation appliances such as mainframes (mechanical chassis) for CD-ROM, printers, facsimile telegraphs, PPC, CRT, copiers of word processor, electronic cash registers, office computer systems, floppy disk drives, keyboards, typewriters, ECR, electronic calculators, toner cartridges, telephones, etc.; electronic and electric materials such as connectors, coil bobbins, switches, relays, relay sockets, LED, variable capacitors, AC adapters, FBT high-tension bobbins, FBT cases, IFT coil bobbins, jacks, volume shafts, motor parts, etc.; and materials for automobiles, such as instrument panel, radiator grille, cluster, speaker grille, louvers, console box, defroster garnish, ornaments, fuse box, relay case, connector shift tape, etc. Thus, said resin composition plays an important role in these industrial fields.

What is claimed is:

1. A fire retardance-imparting additive which comprises a substituted aromatic vinyl resin having acid salt groups as substituents on aromatic rings and comprises a structure represented by the following formula 1:

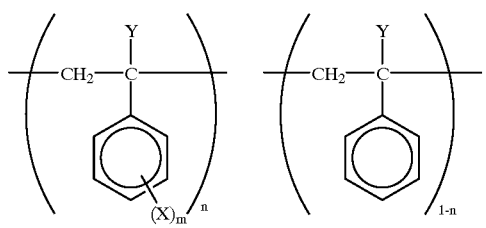

(1)

wherein X is an acid salt group, m is 1 to 5, Y is a hydrogen atom or a hydrocarbon group of 1 to 10 carbon atoms, and n is a molar fraction chosen in a range of $0 < n \leqq 1$.

2. A fire retardance-imparting additive according to claim 1, wherein n is chosen in a range of $0.3 \leqq n \leqq 1$.

3. A fire retardance-imparting additive according to claim 1 or 2, wherein the acid salt group as X is a sulfonic acid metal salt, a phosphoric acid metal salt or a boric acid metal salt.

4. A fire retardance-imparting additive according to claim 1, wherein X is a sulfonic acid alkali metal salt and Y is a hydrogen atom.

5. A fire-retardant resin composition comprising a fire retardance-imparting additive according to claim 1 and a thermoplastic resin(s).

6. A fire-retardant resin composition according to claim 5, which further comprises a fire retardant in an amount of 0.1 to 100 parts by weight per 100 parts by weight of a resin composition comprising said fire retardance-imparting additive and said thermoplastic resin(s).

7. A fire-retardant resin composition according to claim 5 or 6, wherein said thermoplastic resin is selected from the group consisting of a styrene resin, a polyphenylene ether type resin and an aromatic polycarbonates.

* * * * *